US012803041B2

(12) United States Patent
Gong

(10) Patent No.: US 12,803,041 B2
(45) Date of Patent: Nov. 17, 2026

(54) BATTERY CELL AND ELECTRIC DEVICE USING SUCH BATTERY CELL

(71) Applicant: Ningde Amperex Technology Limited, Ningde (CN)

(72) Inventor: Zuzhen Gong, Ningde (CN)

(73) Assignee: Ningde Amperex Technology Limited, Ningde City (CN)

( * ) Notice: Subject to any disclaimer, the term of this patent is extended or adjusted under 35 U.S.C. 154(b) by 521 days.

(21) Appl. No.: 18/465,263

(22) Filed: Sep. 12, 2023

(65) Prior Publication Data

US 2024/0079634 A1 Mar. 7, 2024

Related U.S. Application Data

(63) Continuation of application No. PCT/CN2021/122417, filed on Sep. 30, 2021.

(51) Int. Cl.

*H01M 10/04* (2006.01)
*H01M 4/02* (2006.01)
*H01M 50/531* (2021.01)
*H01M 50/586* (2021.01)
*H01M 50/593* (2021.01)

(52) U.S. Cl.

CPC ......... *H01M 10/0431* (2013.01); *H01M 4/02* (2013.01); *H01M 50/531* (2021.01); *H01M 50/586* (2021.01); *H01M 50/593* (2021.01); *H01M 2220/20* (2013.01)

(58) Field of Classification Search

CPC .. H01M 10/0431; H01M 4/02; H01M 50/531; H01M 50/586; H01M 50/593; H01M 2220/20; H01M 10/0413; H01M 10/0587; H01M 4/13; H01M 10/052; H01M 10/058; H01M 10/4235

See application file for complete search history.

(56) References Cited

FOREIGN PATENT DOCUMENTS

| | | |
|---|---|---|
| CN | 203733894 U | 7/2014 |
| CN | 204809314 U | 11/2015 |

(Continued)

OTHER PUBLICATIONS

Yu et al., CN 214254465, Espacenet machine translation, 2021 (Year: 2021).*

(Continued)

*Primary Examiner* — Adam A Arciero
(74) *Attorney, Agent, or Firm* — Maier & Maier, PLLC

(57) ABSTRACT

A battery cell including a first electrode plate and a second electrode plate alternately stacked, where a separator is disposed therebetween. The first electrode plate includes a first current collector and a first active substance layer. The second electrode plate includes a second current collector and a second active substance layer. The first electrode plate further includes a first recess formed by absence of the first active substance layer on the surface of the first current collector and a first tab disposed in the first recess. The second electrode plate includes a second recess formed by absence of the second active substance layer. In a thickness direction of the battery cell, the first recess and the second recess are arranged opposite to each other. A first insulation layer is disposed on a surface of the first tab, and the second recess is provided with a first insulation holding member.

29 Claims, 18 Drawing Sheets

(56) References Cited

FOREIGN PATENT DOCUMENTS

| | | | |
|---|---|---|---|
| CN | 206250284 | U | 6/2017 |
| CN | 107534127 | A | 1/2018 |
| CN | 109565084 | A | 4/2019 |
| CN | 110729447 | A | 1/2020 |
| CN | 211670270 | U | 10/2020 |
| CN | 212380440 | U | 1/2021 |
| CN | 113054328 | A | 6/2021 |
| CN | 113193163 | A | 7/2021 |
| CN | 113270567 | A | 8/2021 |
| CN | 214254465 | U | 9/2021 |
| JP | 2019197677 | A | 11/2019 |
| JP | 2019212441 | A | 12/2019 |
| WO | 2018099168 | A1 | 6/2018 |
| WO | 2021186716 | A1 | 9/2021 |

OTHER PUBLICATIONS

Dai et al., CN 113193163 A, Espacenet machine translation, 2021 (Year: 2021).*
International Search Report issued on Apr. 26, 2022, in corresponding International Patent Application No. PCT/CN2021/122417, 5 pages.
Office Action issued on Jan. 5, 2024, in corresponding Chinese Application No. 202180006747.6, 17 pages.
Supplementary Search Report issued on May 22, 2025, in corresponding European Application No. 21958975.1, 2 pages.
Office Action issued on Feb. 5, 2026, in corresponding Indian Application No. 202417025269, 7 pages.

* cited by examiner

BATTERY CELL AND ELECTRIC DEVICE USING SUCH BATTERY CELL

CROSS-REFERENCE TO RELATED APPLICATION

The present application is a continuation application of International Patent Application No. PCT/CN2021/122417, filed on Sep. 30, 2021, the content of which is incorporated herein by reference in its entirety.

TECHNICAL FIELD

This application relates to a battery cell and an electric device using such battery cell.

BACKGROUND

Due to advantages such as high energy density, high operating voltage, long cycle life, environmental protection, and safety, batteries have been widely used in various electronic products. Therefore, the demand for battery safety is growing. However, in a battery cell, provision of a tab tends to increase thickness of the battery cell at a region where the tab and an electrode plate are connected, which affects the flatness of the overall structure of the battery cell and thus the use safety of the battery cell.

SUMMARY

In view of the foregoing situation, it is necessary to provide a battery cell conducive to structural flatness and safety.

This application provides a battery cell, including a first electrode plate and a second electrode plate alternately stacked, where a separator is disposed between the first electrode plate and the second electrode plate. The first electrode plate includes a first current collector and a first active substance layer disposed on a surface of the first current collector. The second electrode plate includes a second current collector and a second active substance layer disposed on a surface of the second current collector. The first electrode plate further includes a first recess formed by absence of the first active substance layer and a first tab disposed in the first recess. The second electrode plate includes a second recess formed by absence of the second active substance layer. In a thickness direction of the battery cell, the first recess and the second recess are arranged opposite to each other. A first insulation layer is disposed on a surface of the first tab, and the second recess is provided with a first insulation holding member. The provision of the first insulation holding member in the second recess may reinforce strength and thickness of the second electrode plate at the second recess, and reduce difference between the second electrode plate at the second recess and the second electrode plate at other regions caused by the battery cell being stressed (for example, being pressed), thereby reducing influence on interface consistency of the battery cell. The battery cell disclosed in this application helps to reduce overall thickness of the battery cell, which in turn reduces the influence of provision of the first tab on the overall thickness of the battery cell, and improves structural flatness of the battery cell, thereby improving safety of the battery cell.

According to some embodiments of this application, the first recess and the second recess being arranged opposite to each other means that in the thickness direction of the battery cell, projections of the first recess and the second recess at least partially overlap.

According to some embodiments of this application, in forming the first recess and/or the second recess, absence of a corresponding active substance layer may expose a surface of a current collector of a corresponding polarity, so as to form the first recess and/or the second recess. According to some embodiments of this application, in forming the first recess and/or the second recess, absence of a corresponding active substance layer may expose other functional layers applied on a corresponding current collector, for example, a bottom coating layer. According to some embodiments of this application, in forming the first recess and/or the second recess, a corresponding active substance layer may be partially absent so as to form a first recess and/or a second recess with a bottom surface being the corresponding active substance layer. Therefore, persons skilled in the art may select different recess formation manners based on different requirements.

According to some embodiments of this application, in the thickness direction of the battery cell, a thickness of the first electrode plate at the first tab is $h_1$. A region of two opposite surfaces of the first current collector that are each provided with the first active substance layer in the first electrode plate is a first electrode plate body region, and an average thickness of the first electrode plate body region is $h_2$, where $h_2 > h_1 > h_2/2$. This helps to further improve the structural flatness of the battery cell and ensures strength of the first electrode plate at the first tab, thereby improving the safety of the battery cell.

According to some embodiments of this application, the first current collector includes a main region connected to the first recess and corresponding to the first electrode plate body region, the first recess includes a bottom wall and a side wall connecting the bottom wall and the main region of the first current collector, and an angle between the bottom wall and the side wall is an obtuse angle, so as to fully use area of the first current collector. This helps to improve the structural flatness and energy density of the battery cell. A region of the first current collector corresponding to the first electrode plate body region is the main region. To be specific, two opposite surfaces of the first current collector at this region are each provided with the first active substance layer, so as to form a first electrode plate body region.

According to some embodiments of this application, the first tab extends out of the first electrode plate in a length direction, and a direction perpendicular to both the length direction and the thickness direction is defined as a width direction. In the width direction, the first insulation layer extends beyond the first tab. In the length direction, the first insulation layer extends beyond an end portion of the first tab disposed in the first recess. It is conducive to reduce the risk of short circuit caused by contact between the first tab and the second electrode plate, thereby improving the safety of the battery cell.

According to some embodiments of this application, an orthographic projection of the second recess on a projection plane perpendicular to the thickness direction of the battery cell falls within an orthographic projection of the first recess on the projection plane. It is conducive to reduce the risk of lithium precipitation of the battery cell in use, thereby improving the safety of the battery cell.

According to some embodiments of this application, the second recess is provided with the first insulation holding member, and a second insulation layer is disposed on a surface of the first insulation holding member. In the width direction, a width of the first insulation layer is $W_{t1}$, and a width of the second insulation layer is $W_{t2}$, where $W_{t1}>W_{t2}$. It is conducive to reduce the risk of lithium precipitation of the battery cell in use. In the length direction, the first insulation layer extends beyond the second insulation layer, which reduces the risk of short circuit caused by contact between the second recess and the first electrode plate, thereby improving the safety of the battery cell.

According to some embodiments of this application, a second gap is disposed between the first insulation holding member and the second active substance layer, and the second gap is filled with the second insulation layer. It is conducive to reduce difference between the second electrode plate at the second recess and the second electrode plate at other regions caused by the battery cell being stressed (for example, being pressed), thereby reducing influence on the interface consistency of the battery cell.

According to some embodiments of this application, in the thickness direction of the battery cell, a thickness of the first insulation holding member is less than a thickness of the second active substance layer. It is conducive to improve the structural flatness of the battery cell.

According to some embodiments of this application, a width of the first recess is $W_{r1}$, and a width of the second recess is $W_{r2}$, where $W_{r2}>W_{r1}$; and in the width direction, an edge of the second recess extends beyond an edge of the first recess.

According to some embodiments of this application, in the length direction, an edge of the first recess extends beyond an edge of the second recess. It is conducive to reduce the risk of lithium precipitation of the battery cell in use.

According to some embodiments of this application, on a projection plane perpendicular to the thickness direction of the battery cell, an orthographic projection of the second recess falls within an orthographic projection of the first insulation layer.

According to some embodiments of this application, the first insulation holding member includes one of an adhesive tape or a hot melt adhesive.

According to some embodiments of this application, two surfaces of the first tab spaced apart in the thickness direction are each provided with the first insulation layer. It is conducive to reduce the risk of short circuit caused by contact between the first tab and the second electrode plate, thereby improving the safety of the battery cell.

According to some embodiments of this application, $H_2-H_1\geq 0.02$ mm. It is conducive to improve the structural flatness of the battery cell, thereby improving the safety of the battery cell.

According to some embodiments of this application, in the thickness direction of the battery cell, a thickness of the battery cell at the first tab is $H_1$, and an average thickness of the battery cell is $H_2$, where $H_2\geq H_1$. It is conducive to reduce the overall thickness of the battery cell, which in turn reduces influence of provision of the first tab on the overall thickness of the battery cell, and improves the structural flatness of the battery cell, thereby improving the safety of the battery cell.

According to some embodiments of this application, two surfaces of the first current collector at the first recess are both exposed to form a first slot and a second slot on two opposite surfaces of the first electrode plate respectively.

According to some embodiments of this application, the first tab is disposed in the first slot. The second recess includes a first opposite groove and a second opposite groove. The first opposite groove and the first slot are arranged opposite to each other, and the second opposite groove and the second slot are arranged opposite to each other. It is conducive to reduce influence of provision of the first tab on the overall thickness of the battery cell, and improve the structural flatness of the battery cell, thereby improving the safety of the battery cell.

According to some embodiments of this application, edges of the first opposite groove and the second opposite groove are staggered. It is conducive to increase strength and thickness of a weak region of the battery cell, thereby reducing influence on the interface consistency of the battery cell.

According to some embodiments of this application, edges of the first slot and the second slot are staggered. It is conducive to increase strength and thickness of a weak region of the battery cell, thereby reducing influence on the interface consistency of the battery cell.

According to some embodiments of this application, edges of the first opposite groove and the first slot are staggered. It is conducive to increase strength and thickness of a weak region of the battery cell, thereby reducing influence on the interface consistency of the battery cell.

According to some embodiments of this application, the second electrode plate further includes a third recess formed by absence of the second active substance layer. The battery cell further includes a second tab disposed in the third recess, and a fourth recess is formed by absence of the first active substance layer at the first electrode plate corresponding to two surfaces of the second tab. It is conducive to reduce influence of provision of the second tab on the overall thickness of the battery cell, and improve the structural flatness of the battery cell, thereby improving the safety of the battery cell.

According to some embodiments of this application, a third insulation layer is disposed on a surface of the second tab. The fourth recess is provided with a second insulation holding member, a fourth insulation layer is disposed on a surface of the second insulation holding member, and the fourth insulation layer extends beyond the third insulation layer. It is conducive to reduce the risk of short circuit caused by contact between the second tab and the first electrode plate, thereby improving the safety of the battery cell.

According to some embodiments of this application, the first tab extends out of the first electrode plate in a length direction, and a direction perpendicular to both the length direction and the thickness direction is defined as a width direction. In the width direction, the first active substance layer is disposed on two sides of the first recess.

According to some embodiments of this application, in the length direction, the first recess runs through the first active substance layer.

According to some embodiments of this application, the first tab extends out of the first electrode plate in a length direction; and in the length direction, the first active substance layer is disposed on both a first side and a second side of the first recess, the first side and the second side being opposite each other. It is conducive to reduce the risk of adhesive overflow in the process of forming the first recess, and reinforce strength and thickness of the battery cell at the first recess.

According to some embodiments of this application, in the length direction, the first tab extends out of the first side of the first recess, and a width of the first active substance layer disposed on the first side is 2 mm to 4 mm.

According to some embodiments of this application, in the length direction, the width of the first active substance layer disposed on the first side is 3 mm.

According to some embodiments of this application, the battery cell is a wound battery cell, the first electrode plate includes a plurality of first tabs, and in the thickness direction of the battery cell, the plurality of first tabs are stacked.

This application further provides an electric device, including a load and the foregoing battery cell, where the battery cell is configured to supply power to the load.

REFERENCE SIGNS OF MAIN COMPONENTS

Figure 1A:
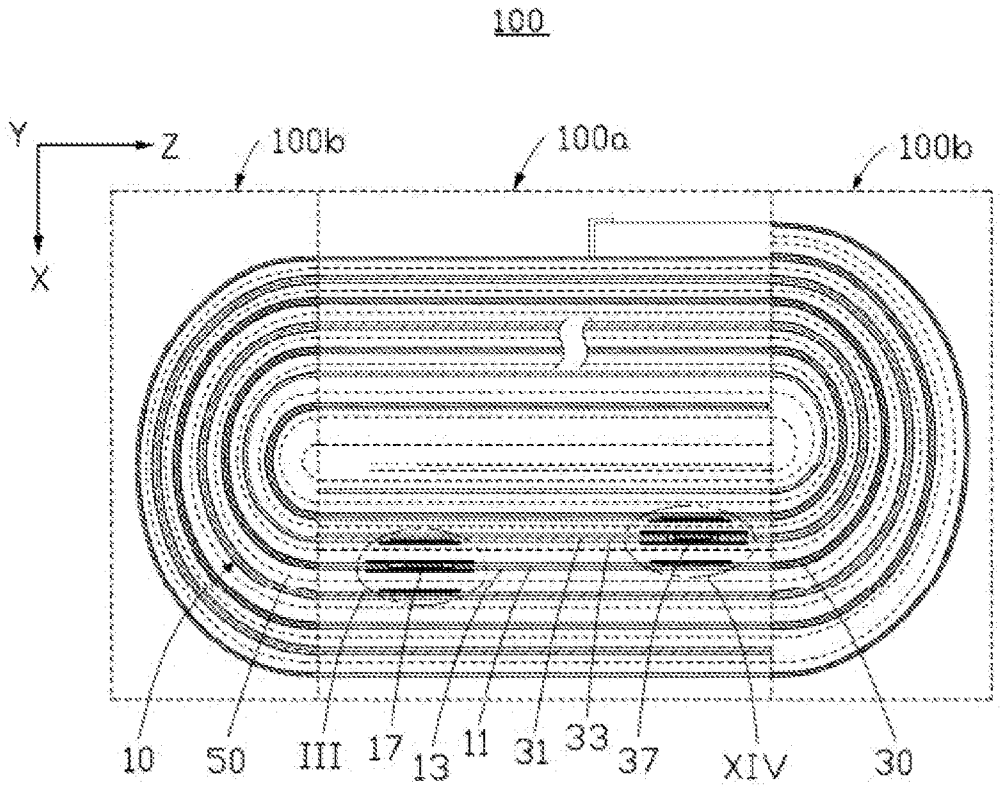
FIG. 1A is a schematic structural diagram of a battery cell according to an embodiment of this application.

| | |
|---|---|
| battery cell | 100 |
| first electrode plate | 10 |
| second electrode plate | 30 |
| separator | 50 |
| straight portion | 100a |
| bending portion | 100b |
| thickness direction | X |
| length direction | Y |
| width direction | Z |
| first current collector | 11 |
| first active substance layer | 13 |
| first recess | 15 |
| first tab | 17 |
| second current collector | 31 |
| second active substance layer | 33 |
| second recess | 35 |
| first side | 12a |
| second side | 12b |
| first electrode plate body region | 101 |
| main region | 111 |
| bottom wall | 151 |
| side wall | 153 |
| first gap | 18 |
| angle | α |
| first insulation layer | 21 |
| end portion | 171, 371 |
| first insulation holding member | 22 |
| second gap | 36 |
| second insulation layer | 23 |
| first slot | 15a |
| second slot | 15b |
| first opposite groove | 35a |
| second opposite groove | 35b |
| third recess | 38 |
| second tab | 37 |
| third insulation layer | 25 |
| fourth recess | 19 |
| second insulation holding member | 26 |
| fourth insulation layer | 27 |
| electric device | 200 |

This application will be further described with reference to the accompanying drawings in the following specific embodiments.

DETAILED DESCRIPTION

The following clearly and in detail describes the technical solutions in some embodiments of this application. Apparently, the described embodiments are only some rather than all of the embodiments of this application. Unless otherwise defined, all technical and scientific terms used herein shall have the same meanings as commonly understood by persons skilled in the art to which this application belongs. The terms used in the specification of this application are merely intended to describe specific embodiments but not intended to constitute any limitation on this application.

The following describes some embodiments of this application in detail. However, this application may be embodied in many different implementations and should not be construed as being limited to the example embodiments set forth herein. Rather, these example embodiments are provided so that this application can be conveyed to persons skilled in the art thoroughly and in detail.

In addition, in the accompanying drawings, sizes or thicknesses of various components and layers may be enlarged for brevity and clarity. Throughout the text, the same numerical values represent the same elements. As used herein, the term "and/or" includes any and all combinations of one or more of the associated listed items. In addition, it should be understood that when an element A is referred to as being "connected to" an element B, the element A may be directly connected to the element B, or an intervening element C may be present therebetween such that the element A and the element B are indirectly connected to each other.

Further, the use of "may" in the descriptions of the following embodiments of this application means "one or more embodiments of this application".

The terminology used herein is merely intended to describe specific embodiments but not intended to constitute any limitation on this application. As used herein, the singular forms are intended to include the plural forms as well, unless the context clearly indicates otherwise. It should be further understood that the term "include", when used in this specification, specifies the presence of stated features, numbers, steps, operations, elements, and/or components but do not preclude the presence or addition of one or more other features, numbers, steps, operations, elements, components, and/or combinations thereof.

Spatial related terms such as "above" may be used herein for ease of description to describe the relationship between one element or feature and another element (a plurality of elements) or feature (a plurality of features) as illustrated in the figure. It should be understood that the spatial related terms are intended to include different orientations of a device or an apparatus in use or operation in addition to the orientations depicted in the figures. For example, if the device in the figures is turned over, elements described as "over" or "above" other elements or features would then be oriented "beneath" or "below" the other elements or features. Thus, the example term "above" may include both orientations of above and below.

It should be understood that when an element or layer is described as being "on" another element or layer, "connected to" another element or layer, "combined with" another element or layer, or "close to" another element or layer, the element or layer may be "directly on" the another element or layer, "directly coupled to" the another element or layer, "directly connected to" the another element or layer, "directly combined with" the another element or layer, or "directly close to" the another element or layer, or there may be one or more intermediate elements or intermediate layers. In addition, "connection", "connected", or the like may also mean "electrically connected" or the like based on its content understood by persons skilled in the art. In addition, when an element, component, region, layer, and/or portion is described as being "between" two elements, components, regions, layers, and/or portions, it may be the only element, component, region, layer, and/or portion between the two elements, components, regions, layers, and/or portions, or one or more intermediate elements, components, regions, layers, and/or portions may be present.

It should be understood that although the terms first, second, third, or the like may be used herein to describe various elements, components, regions, layers, and/or portions, these elements, components, regions, layers, and/or portions should not be limited by these terms. These terms are used to distinguish one element, component, region, layer, or portion from another element, component, region, layer, or portion. Therefore, the first element, component, region, layer, or portion discussed below may be referred to as the second element, component, region, layer, or portion without departing from the teachings of the example embodiments.

Some embodiments of this application are described in detail below. Provided that there is no conflict, the following examples/embodiments and features in the examples/embodiments may be combined with each other.

Figure 2:
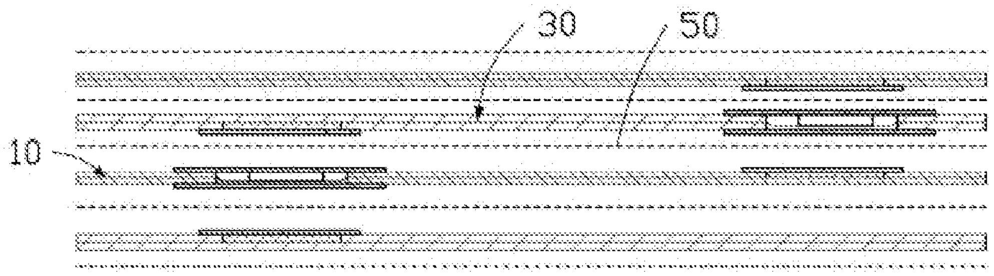
FIG. 2 is a schematic structural diagram of a battery cell according to another embodiment of this application.

Refer to FIG. 1A and FIG. 2. A battery cell 100 includes a first electrode plate 10, a second electrode plate 30, and a separator 50. The separator 50 is located between the first electrode plate 10 and the second electrode plate 30. Refer to FIG. 1A, the first electrode plate 10, the separator 50, and the second electrode plate 30 are stacked to form a stack, and the stack is wound to form a wound battery cell. The wound battery cell includes a straight portion 100*a* and bending portions 100*b* connected to two opposite ends of the straight portion 100*a*. A stacking direction of parts of the first electrode plate 10, the separator 50, and the second electrode plate 30 corresponding to the straight portion 100*a* is defined as a thickness direction X of the battery cell, that is, a direction perpendicular to a main plane of the battery cell. Refer to FIG. 2. The first electrode plate 10, the separator 50, and the second electrode plate 30 may alternatively be directly stacked to form a stack, so as to obtain a laminated battery cell. In this case, a thickness direction X of the battery cell is a stacking direction of the first electrode plate 10, the separator 50, and the second electrode plate 30.

Refer to FIG. 1A to FIG. 4B. The first electrode plate 10 includes a first current collector 11 and a first active substance layer 13 disposed on a surface of the first current collector 11. The first electrode plate 10 is further provided with a first recess 15 formed by partial absence of the first active substance layer 13, and the first electrode plate 10 further includes a first tab 17 disposed in the first recess 15 and connected to the first electrode plate 10. In this application, the first tab 17 extends out of the first current collector 11 in a length direction Y, and a direction perpendicular to both the thickness direction X and the length direction Y is defined as a width direction Z.

The second electrode plate 30 includes a second current collector 31 and a second active substance layer 33 disposed on a surface of the second current collector 31. The second electrode plate 30 is further provided with a second recess 35 formed by partial absence of the second active substance layer 33.

Refer to FIG. 1A and FIG. 2. In the thickness direction X of the battery cell, the first recess 15 and the second recess 35 are arranged opposite to each other; and in the thickness direction X of the battery cell, a thickness of the battery cell at the first tab 17 is $H_1$, and an average thickness of the battery cell is $H_2$, where $H_2 \geq H_1$. It is conducive to reduce overall thickness of the battery cell, which in turn reduces influence of provision of the first tab on the overall thickness of the battery cell, and improves structural flatness of the battery cell, thereby improving safety of the battery cell.

In some embodiments, $H_2 - H_1 \geq 0.02$ mm. It is conducive to improve the structural flatness of the battery cell, thereby improving the safety of the battery cell.

When the first electrode plate 10 is a cathode electrode plate, the second electrode plate 30 is an anode electrode plate. When the first electrode plate 10 is an anode electrode plate, the second electrode plate 30 is a cathode electrode plate. In this application, the first electrode plate 10 being a cathode electrode plate and the second electrode plate 30 being an anode electrode plate is used as an example for further description.

Figure 3:
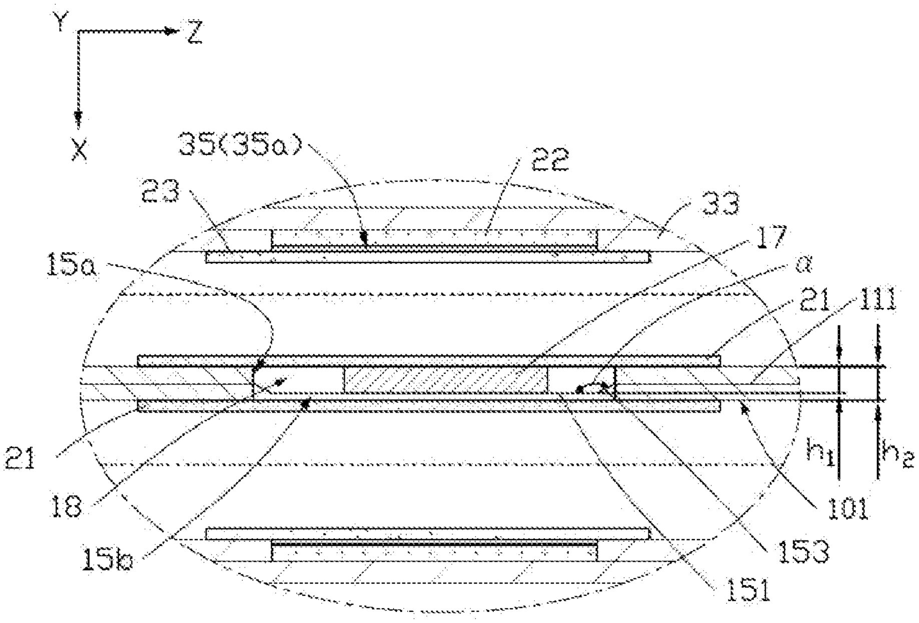
FIG. 3 is a partial enlarged cross-sectional view of a battery cell at position III according to an embodiment of this application.
Figure 4A:
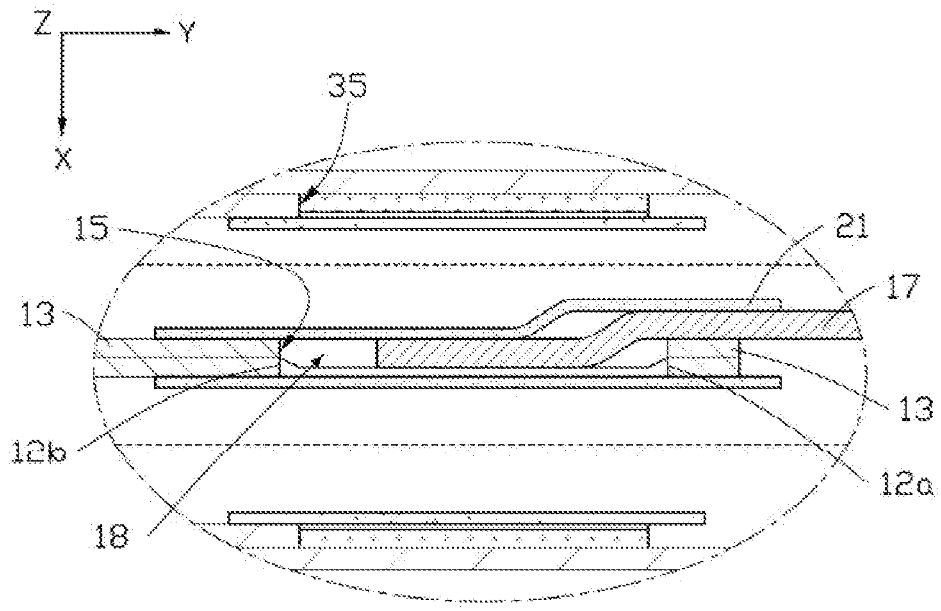
FIG. 4A is a partial enlarged cross-sectional view of a battery cell in a plane perpendicular to a width direction according to an embodiment of this application.
Figure 4B:
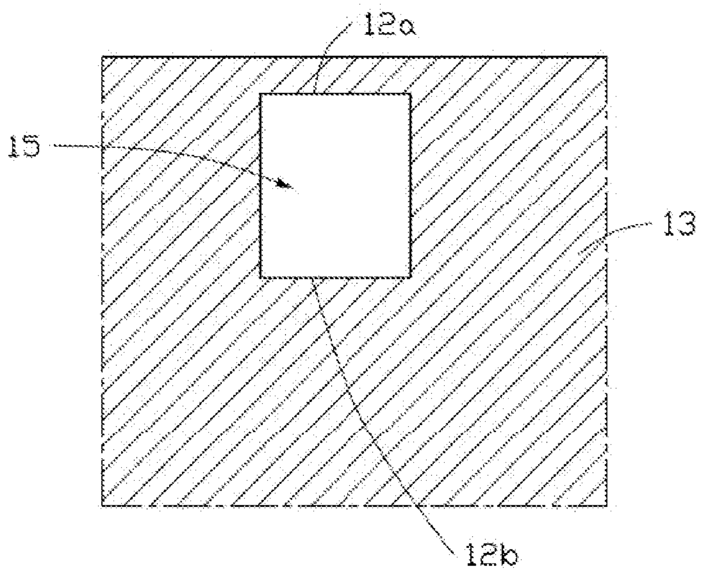
FIG. 4B is a partial cross-sectional view of a battery cell with no tab provided in a plane perpendicular to a thickness direction according to an embodiment of this application.

Refer to FIG. 3. In the width direction Z, the first active substance layer 13 is disposed on each of two sides of the first recess 15. In the length direction Y, the first active substance layer 13 is disposed on at least one side of the first recess 15. As shown in FIG. 4, in the length direction Y, the first active substance layer 13 is disposed on a first side 12*a* and a second side 12*b* of the first recess 15 that are opposite to each other. In the length direction Y, the first tab 17 extends out of the first side 12*a* of the first recess 15, and a width of the first active substance layer 13 disposed on the first side 12*a* may be 2 mm to 4 mm. In some embodiments, in the length direction Y, the width of the first active substance layer 13 disposed on the first side 12*a* may be 3 mm. The first active substance layer 13 disposed on the first side 12*a* in the length direction Y helps to reduce the risk of adhesive overflow in the process of forming the first recess 15. In addition, when the second recess 35 and its corresponding region are filled with a material such as the second active substance layer 33 or an adhesive layer, the first active substance layer 13 on the side of the first recess 15 from which the first tab 17 extends out in the length direction Y helps to reinforce strength and thickness of the battery cell 100 at the first recess 15.

Figure 5:
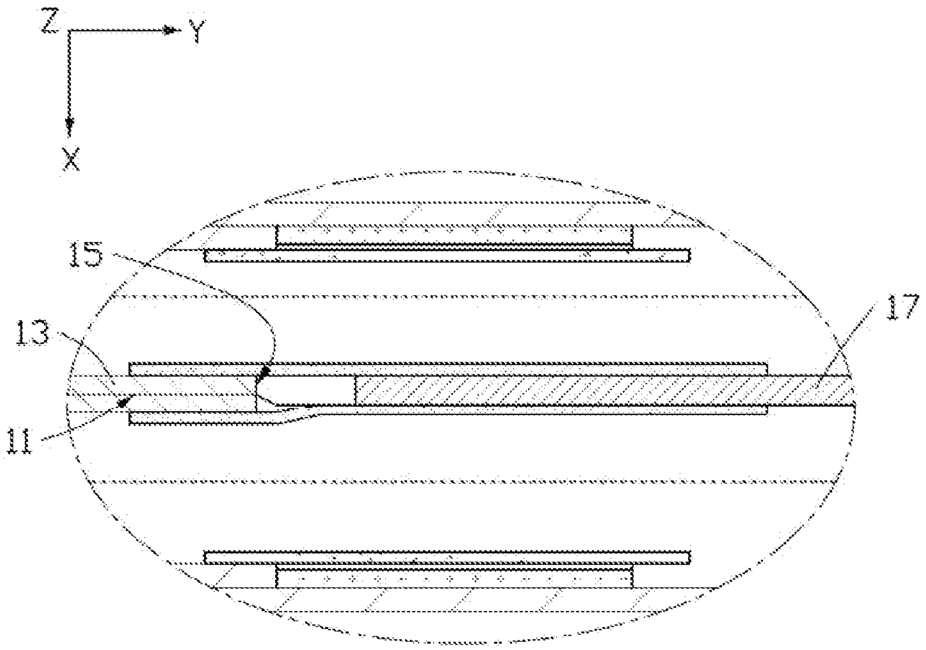
FIG. 5 is a partial cross-sectional view of a battery cell in a plane perpendicular to a width direction according to another embodiment of this application.

In some other embodiments, as shown in FIG. 5, in the length direction Y, one side of the first recess 15 may be provided with the first active substance layer 13, and the other side may extend to an edge of the first current collector 11.

Figure 6:
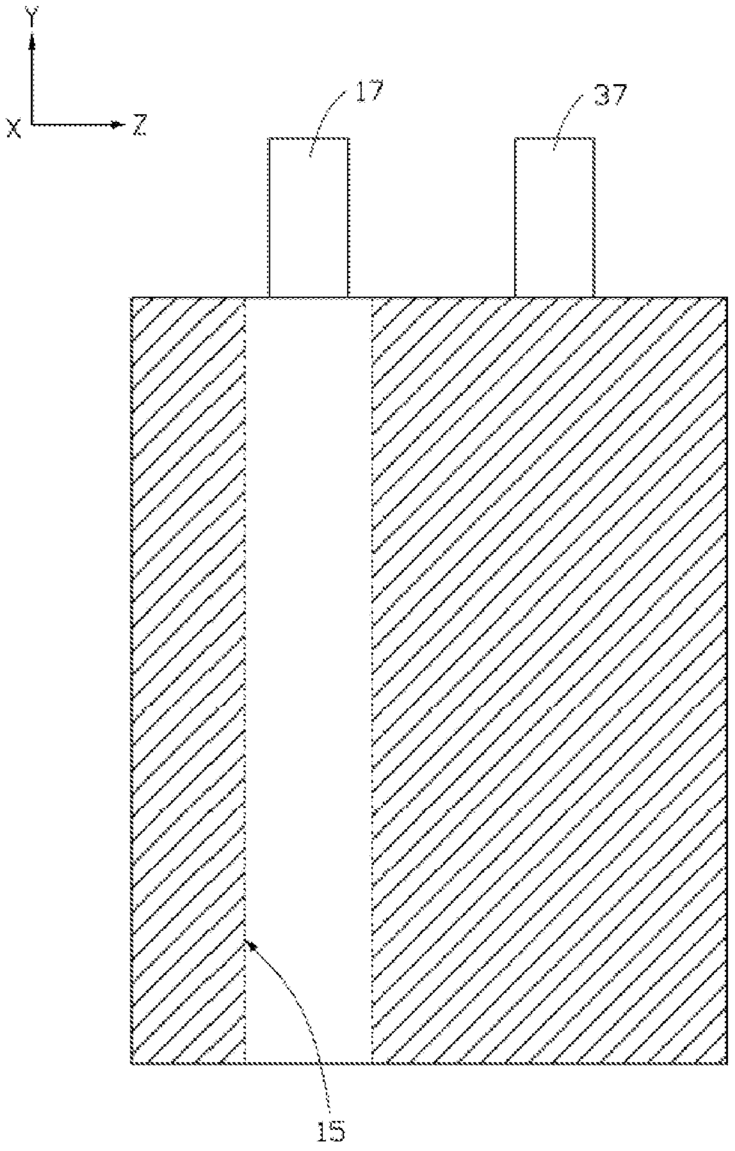
FIG. 6 is a schematic cross-sectional view of a battery cell in a plane perpendicular to a thickness direction according to still another embodiment of this application.

In still some other embodiments, refer to FIG. 6. In the length direction Y, the first recess 15 may alternatively run through the first active substance layer 13.

Figure 1B:
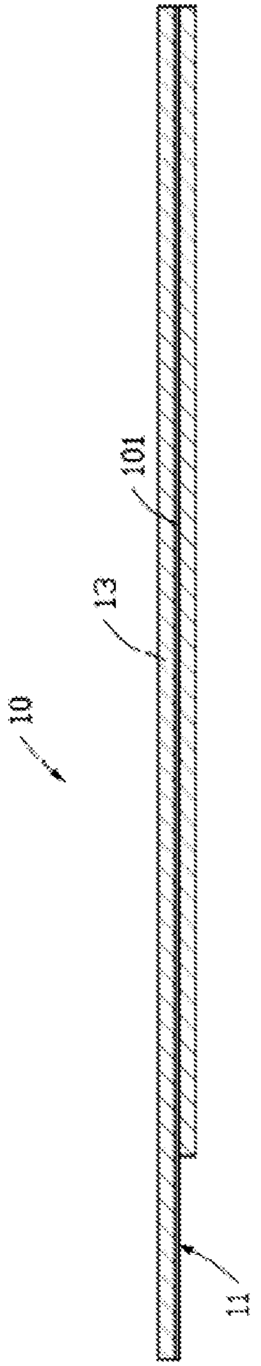
FIG. 1B is a schematic structural diagram of a first electrode plate according to an embodiment of this application.

Refer to FIG. 1B and FIG. 3. A region of two opposite surfaces of the first current collector 11 that are each provided with the first active substance layer 13 in the first electrode plate 10 is a first electrode plate body region 101. In some embodiments, in the thickness direction X of the battery cell, a thickness of the first electrode plate 10 at the first tab 17 is $h_1$, and an average thickness of the first electrode plate body region 101 is $h_2$, where $h_1$ and $h_2$ satisfy $h_2>h_1>h_2/2$. It is conducive to further improve the structural flatness of the battery cell and ensures strength of the first electrode plate 10 at the first tab 17, thereby improving the safety of the battery cell. In some embodiments, $75\ \mu m \leq h_2 \leq 120\ \mu m$, and $68\ \mu m \leq h_1 \leq 120\ \mu m$.

The first current collector 11 includes a main region 111 connected to the first recess 15 and corresponding to the first electrode plate body region 101. In some embodiments, the first recess 15 may be recessed in a direction leaving the first tab 17 connected to the first recess 15 with respect to the main region 111 of the first current collector 11, so as to leave room for providing the first tab 17. It is conducive to reduce influence of provision of the first tab 17 on thickness of the battery cell at the first recess 15, thereby improving the structural flatness of the battery cell with the first tab 17 provided.

The first recess 15 includes a bottom wall 151 and a side wall 153 connecting the bottom wall 151 and the main region 111 of the first current collector 11. The first recess 15 and the space corresponding to the first recess 15 and formed by absence of the first active substance layer jointly form an accommodating region for providing the first tab 17, so as to fully use the space of the first electrode plate 10 in the thickness direction. This reduces the risk of the first tab 17 extending beyond the first electrode plate 10 in the thickness direction, and also reduces the risk of burrs on a cutting section of the first current collector 11 extending beyond the first electrode plate 10 in the thickness direction, thereby reducing the probability of short circuit. An angle α between the bottom wall 151 and the side wall 153 is an obtuse angle so as to fully use area of the first current collector 11. This helps to improve the structural flatness of the battery cell and increase energy density of the battery cell. In some embodiments, the first tab 17 is disposed on the bottom wall 151 and may be spaced apart from the first active substance layer 13 to form a first gap 18. The side wall 153 is exposed from the first gap 18, and a peripheral region of the bottom wall 151 may also be exposed from the first gap 18.

In some embodiments, $1350 \leq \alpha < 180°$, so as to ensure that the first current collector 11 is not excessively recessed, thereby ensuring that the burrs on the cutting section of the first current collector 11 do not penetrate the separator in the thickness direction to cause an internal short circuit, and reducing the risk of the first current collector being broken during welding.

Figure 7:
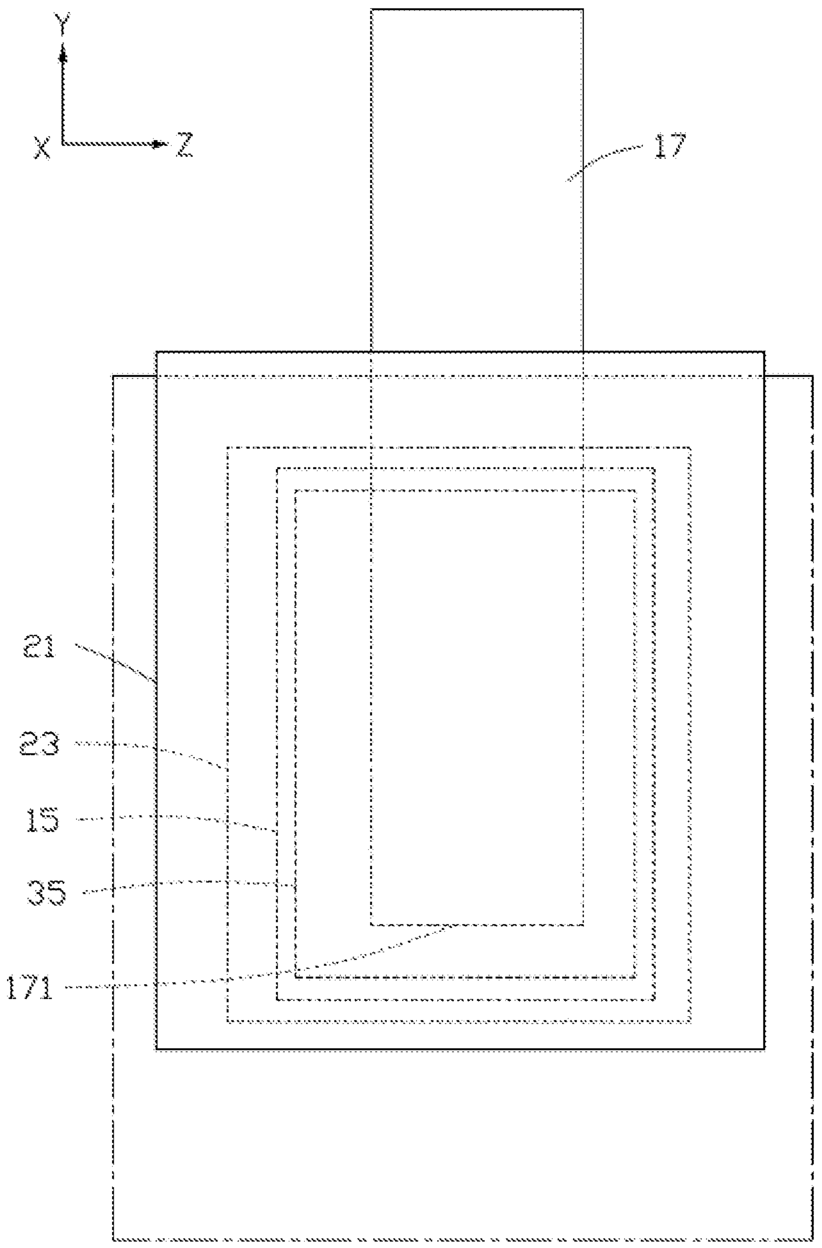
FIG. 7 is a partial cross-sectional view of a battery cell in a plane perpendicular to a thickness direction according to yet another embodiment of this application.

In some embodiments, refer to FIG. 3 and FIG. 7. The battery cell 100 may further include a first insulation layer 21, and the first insulation layer 21 is disposed on a surface of the first tab 17. In the width direction Z, the first insulation layer 21 extends beyond the first tab 17, that is, an edge of the first insulation layer 21 extends out of an edge of the first tab 17, such that the first insulation layer 21 covers the entire first tab 17 in the width direction Z. It is conducive to reduce the risk of short circuit caused by contact between the first tab 17 and the second electrode plate 30, thereby improving the safety of the battery cell. In the length direction Y, the first insulation layer 21 extends beyond an end portion 171 of the first tab 17 disposed in the first recess 15, that is, the edge of the first insulation layer 21 extends out of the end portion 171 of the first tab 17, such that the first insulation layer 21 covers the entire end portion 171 of the first tab 17 in the length direction Y It is conducive to reduce the risk of short circuit caused by contact between the first tab 17 and the second electrode plate 30, thereby improving the safety of the battery cell. In the width direction Z, a width of the first insulation layer 21 is $W_{t1}$. In some embodiments, in the width direction Z, a width of a side of the first insulation layer 21 extending beyond the first tab 17 may be greater than or equal to 0.5 mm and less than 15 mm.

A material of the first insulation layer 21 includes an adhesive layer.

In some embodiments, refer to FIG. 7. An orthographic projection of the second recess 35 on a projection plane perpendicular to the thickness direction X of the battery cell may fall within an orthographic projection of the first recess 15 on the projection plane. It is conducive to reduce the risk of lithium precipitation of the battery cell in use.

Refer to FIG. 3. The battery cell 100 may further include a first insulation holding member 22, and the first insulation holding member 22 is disposed in the second recess 35. It is conducive to reinforce strength and thickness of the second electrode plate 30 at the second recess 35, and reduce difference between the second electrode plate 30 at the second recess 35 and the second electrode plate 30 at other regions caused by the battery cell being stressed (for example, being pressed), thereby reducing influence on interface consistency of the battery cell.

In the thickness direction X of the battery cell, a thickness of the first insulation holding member 22 is preferably less than a thickness of the second active substance layer 33 of the second current collector 31 on the same side, where the second active substance layer 33 encloses the second recess 35. To be specific, the thickness of the first insulation holding member 22 is less than average thickness of the second active substance layer 33 on the same side or main thickness of the main region 111 of the first current collector 11 corresponding to the second active substance layer 33 on the same side, thereby helping to improve the structural flatness of the battery cell. In some embodiments, in the thickness direction X of the battery cell, a thickness difference between the first insulation holding member 22 and the second active substance layer 33 on the same side that encloses the second recess 35 is greater than 0 and less than 70 μm.

The first insulation holding member 22 may be but is not limited to an insulation adhesive, for example, an adhesive tape or a hot melt adhesive. When the first insulation holding member 22 is a hot melt adhesive, in the case of being heated, the first insulation holding member 22 may effectively fill the second recess 35, so that the first insulation holding member 22 is seamlessly connected to the second active substance layer 33. This further reduces difference between the second electrode plate 30 at the second recess 35 and the second electrode plate 30 at other regions caused by the battery cell being stressed (for example, being pressed), thereby reducing influence on the interface consistency of the battery cell.

Figure 8:
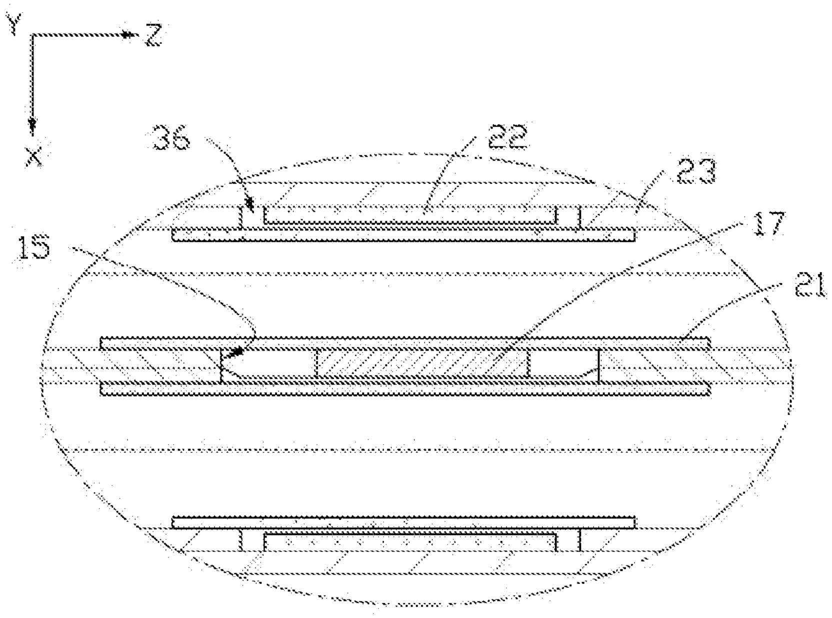
FIG. 8 is a partial enlarged cross-sectional view of a battery cell in a plane perpendicular to a length direction according to another embodiment of this application.

In some embodiments, as shown in FIG. 8, the first insulation holding member 22 may alternatively be spaced apart from the second active substance layer 33 to form a second gap 36.

Refer to FIG. 3 and FIG. 7. The battery cell 100 may further include a second insulation layer 23, and the second insulation layer 23 is disposed on a surface of the first insulation holding member 22. In some embodiments, the second insulation layer 23 covers the entire first insulation holding member 22. In the width direction Z, a width of the second insulation layer 23 is $W_{t2}$, where $W_{t1}>W_{t2}$. It is conducive to reduce the risk of lithium precipitation of the battery cell in use.

In some embodiments, the periphery of the second insulation layer 23 may alternatively extend from the periphery of the first insulation holding member 22, and cover part of a surface of the second active substance layer 33 enclosing the second recess 35. This reduces the risk of short circuit caused by contact between the second recess and the first electrode plate 10, thereby helping to improve the safety of the battery cell. In some embodiments, a width of the second insulation layer 23 covering the surface of the second active substance layer 33 on a side of the second recess 35 is greater than 0 and less than 11.5 mm.

Figure 9:
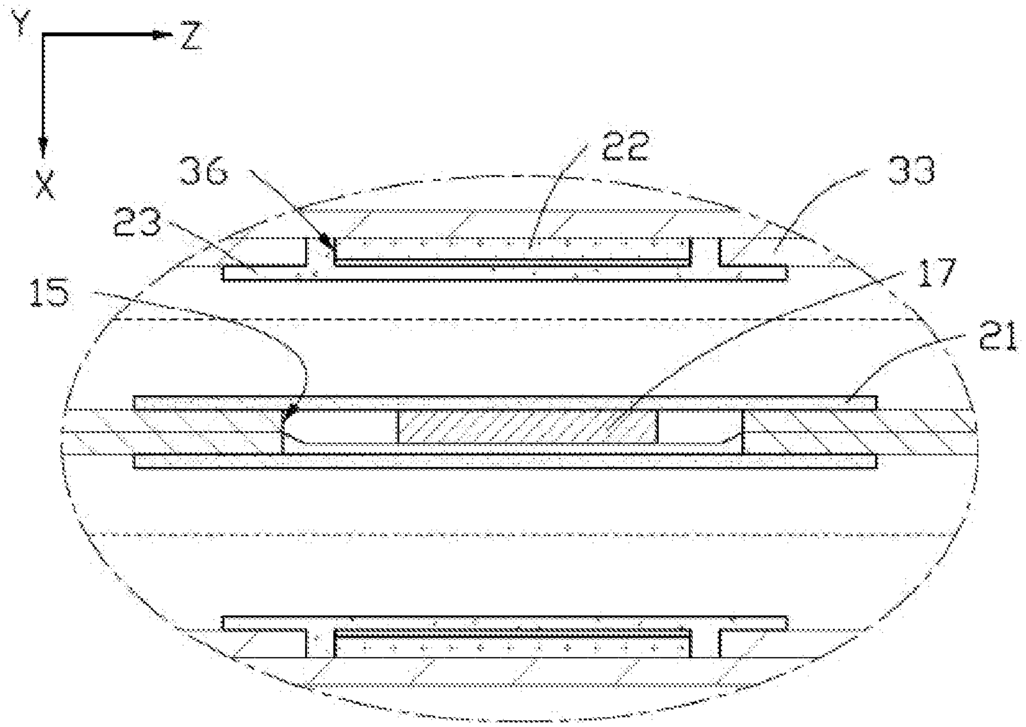
FIG. 9 is a partial enlarged cross-sectional view of a battery cell in a plane perpendicular to a length direction according to still another embodiment of this application.

In some embodiments, as shown in FIG. 9, the second insulation layer 23 may alternatively extend from the surface of the first insulation holding member 22 and fill the second gap 36, so as to further reduce difference between the second electrode plate 30 at the second recess 35 and the second electrode plate 30 at other regions caused by the battery cell being stressed (for example, being pressed), thereby reducing influence on the interface consistency of the battery cell. In this case, the second insulation layer 23 may include a hot melt adhesive, so as to fill the second gap 36 when the second insulation layer 23 is pressed onto the second electrode plate 30.

Figure 10:
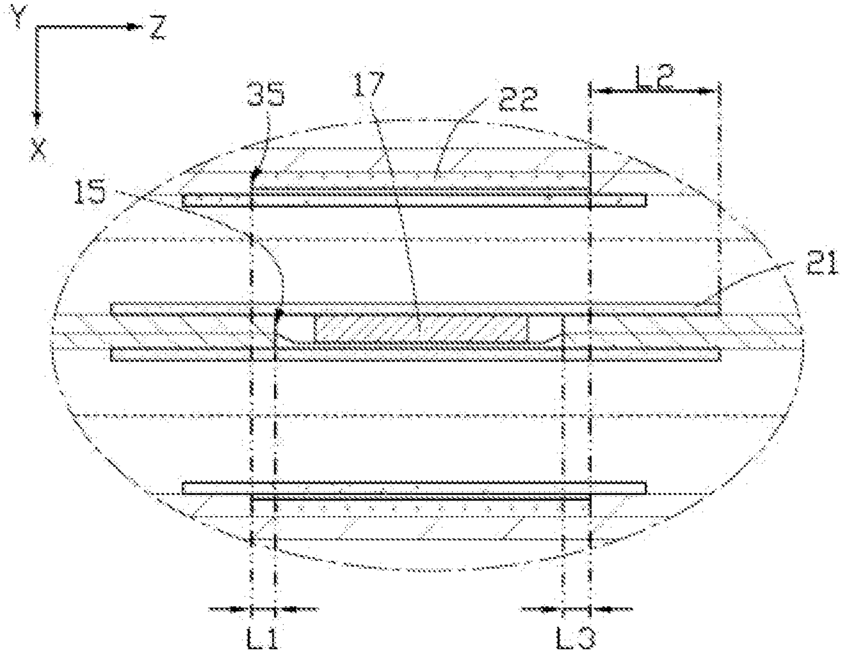
FIG. 10 is a partial enlarged cross-sectional view of a battery cell in a plane perpendicular to a length direction according to another embodiment of this application.

In some embodiments, refer to FIG. 10. In the width direction Z, a width of the first recess 15 is $W_{r1}$, and a width of the second recess 35 is $W_{r2}$, where $W_{r2}>W_{r1}$ may also be satisfied. Further, in the width direction Z, an edge of the second recess 35 extends beyond an edge of the first recess 15. In this case, to reduce the risk of lithium precipitation of the battery cell in use, in the width direction Z, the edge of the first insulation layer 21 extends beyond the edge of the second recess 35. In the width direction Z, an edge of the first insulation holding member 22 disposed in the second recess 35 may extend beyond the edge of the first recess 15, so as to effectively reduce the risk of short circuit caused by contact between the first tab 17 and the second recess 35 as well as contact between the first recess 15 and the second recess 35, thereby helping to improve the safety of the battery cell.

In some embodiments, in the width direction Z, a width $L_1$ of the edge of the second recess 35 extending beyond the edge of the first recess 15 may satisfy $0<L_1<11.5$ mm. A width $L_2$ of the edge of the first insulation layer 21 extending beyond the edge of the second recess 35 may satisfy 1.5 mm$<L_2<13$ mm. A width $L_3$ of the edge of the first insulation holding member 22 extending beyond the edge of the first recess 15 may satisfy $0<L_3<13$ mm.

To reduce the risk of lithium precipitation of the battery cell in use, in the length direction Y, an edge of the first recess 15 may extend beyond an edge of the second recess 35. In some embodiments, in the length direction Y, a length of the edge of the first recess 15 extending beyond the edge of the second recess 35 may be greater than 1.5 mm and less than a length of the first electrode plate 10 in the length direction Y.

Figure 11:
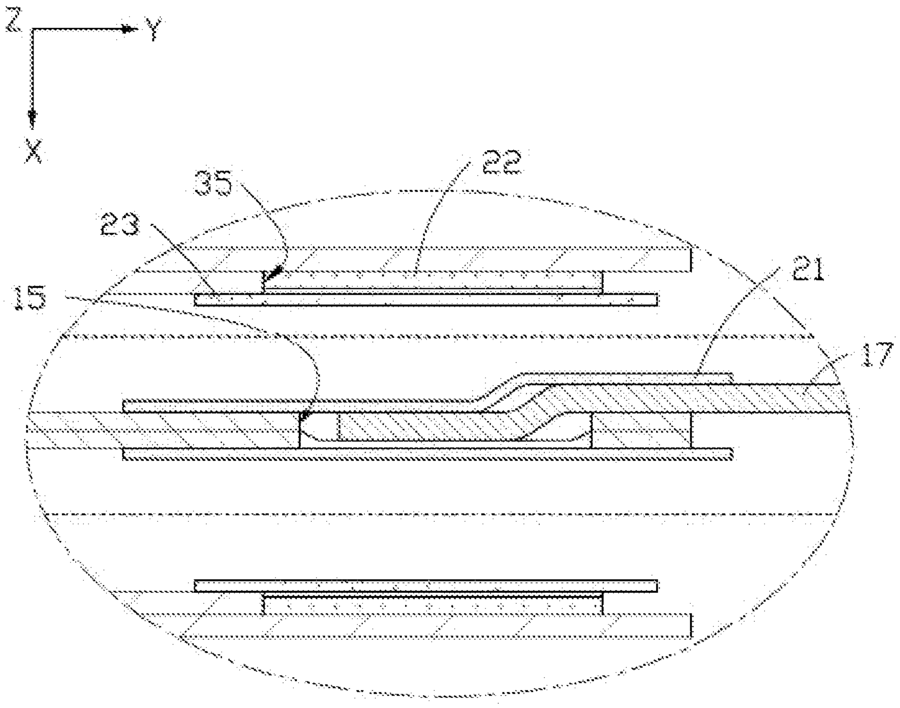
FIG. 11 is a partial enlarged cross-sectional view of a battery cell in a plane perpendicular to a width direction according to another embodiment of this application.

In some embodiments, refer to FIG. 11. In the length direction Y, the edge of the second recess 35 may alternatively extend beyond the edge of the first recess 15. That is, an orthographic projection of the first recess 15 on a projection plane perpendicular to the thickness direction X of the battery cell may fall within an orthographic projection of the second recess 35 on the projection plane. In this case, to reduce the risk of lithium precipitation of the battery cell in use, on the projection plane perpendicular to the thickness direction X of the battery cell, the entire orthographic projection of the second recess 35 falls within an orthographic projection of the first insulation layer 21. On the projection plane perpendicular to the thickness direction X of the battery cell, the entire orthographic projection of the first recess 15 may fall within an orthographic projection of the first insulation holding member 22 disposed in the second recess 35. This further reduces the risk of short circuit caused by contact between the first tab 17 and the second recess 35 as well as contact between the first recess 15 and the second recess 35, thereby helping to improve the safety of the battery cell. In this case, the second insulation layer 23 may be omitted.

Refer to FIG. 3. Two opposite surfaces of the first current collector 11 at the first recess 15 are both exposed to form a first slot **15*a* and a second slot 15*b* on two opposite sides of the first electrode plate 10 respectively, the first slot 15*a* and the second slot 15*b* being opposite each other. In this embodiment, the first tab 17 is disposed in the first slot 15*a***.

Two surfaces of the first tab 17 spaced apart in the thickness direction X of the battery cell may be each provided with the first insulation layer 21. Specifically, one first insulation layer 21 is disposed on a surface of the first tab 17 facing away from the second slot **15*b*, and the other first insulation layer 21 covers a side of the second slot 15*b* facing away from the first slot 15*a* and covers part of the first active substance layer 13**.

Figure 12:
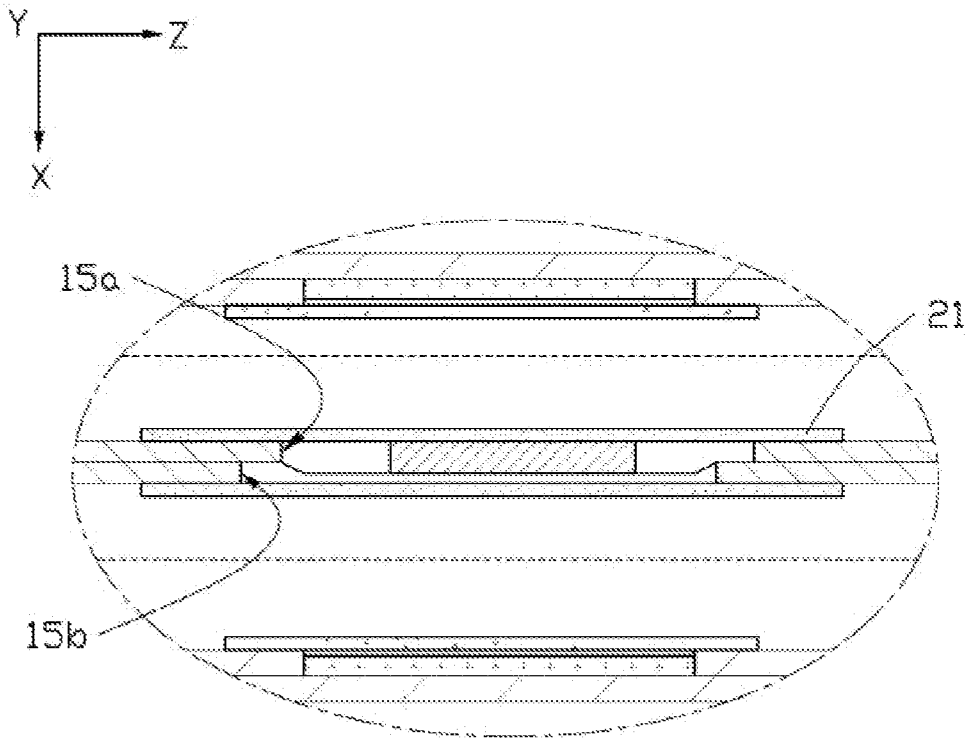
FIG. 12 is a partial cross-sectional view of a battery cell in a plane perpendicular to a length direction according to another embodiment of this application.

Refer to FIG. 12. An edge of the first slot **15*a* and an edge of the second slot 15*b* may be staggered. This helps to prevent a gap surrounding the first slot 15*a* from overlapping a gap surrounding the second slot 15*b*, and increase strength and thickness of a weak region of the battery cell, thereby reducing influence on the interface consistency of the battery cell. In some embodiments, the edge of the first slot 15***a* and the edge of the second slot 15*b* may alternatively overlap or be partially staggered.

In some embodiments, refer to FIG. 3 and FIG. 10. The second recess 35 includes a first opposite groove 35*a* and a second opposite groove 35*b*. The first opposite groove 35*a* and the first slot 15*a* are arranged opposite each other, and the second opposite groove 35*b* and the second slot 15*b* are arranged opposite to each other.

Figure 13:
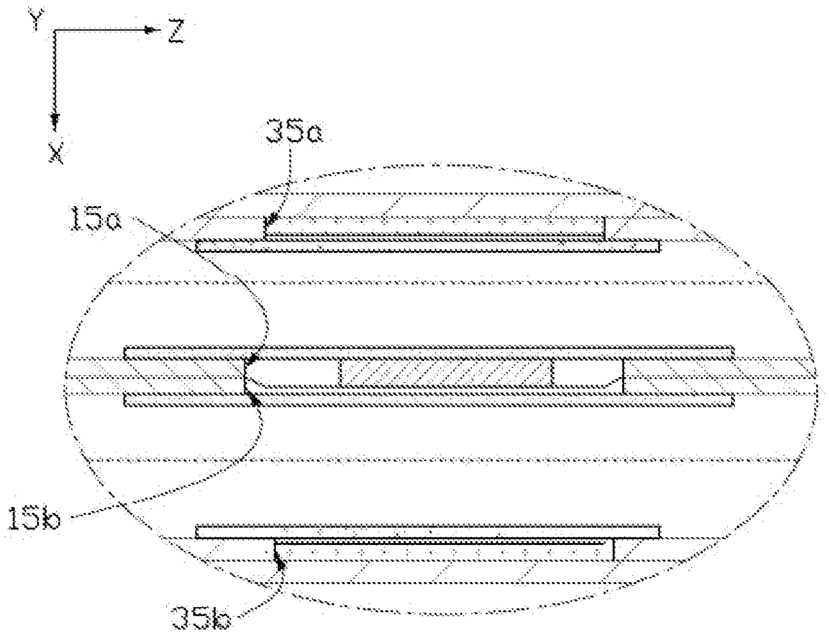
FIG. 13 is a partial enlarged cross-sectional view of a battery cell in a plane perpendicular to a length direction according to still another embodiment of this application.

Refer to FIG. 13. An edge of the first opposite groove 35*a* and an edge of the second opposite groove 35*b* may be staggered. It is conducive to prevent a gap surrounding the first opposite groove 35*a* from overlapping a gap surrounding the second opposite groove 35*b*, and increase strength and thickness of a weak region of the battery cell, thereby reducing influence on the interface consistency of the battery cell. In some embodiments, the edge of the first opposite groove 35*a* and the edge of the second opposite groove 35*b* may alternatively overlap or be partially staggered.

An edge of the first opposite groove 35*a* and an edge of the first slot 15*a* may be staggered, and an edge of the second opposite groove 35*b* and an edge of the second slot 15*b* may be staggered. This also helps to increase strength and thickness of a weak region of the battery cell, thereby reducing influence on the interface consistency of the battery cell.

Figure 14:
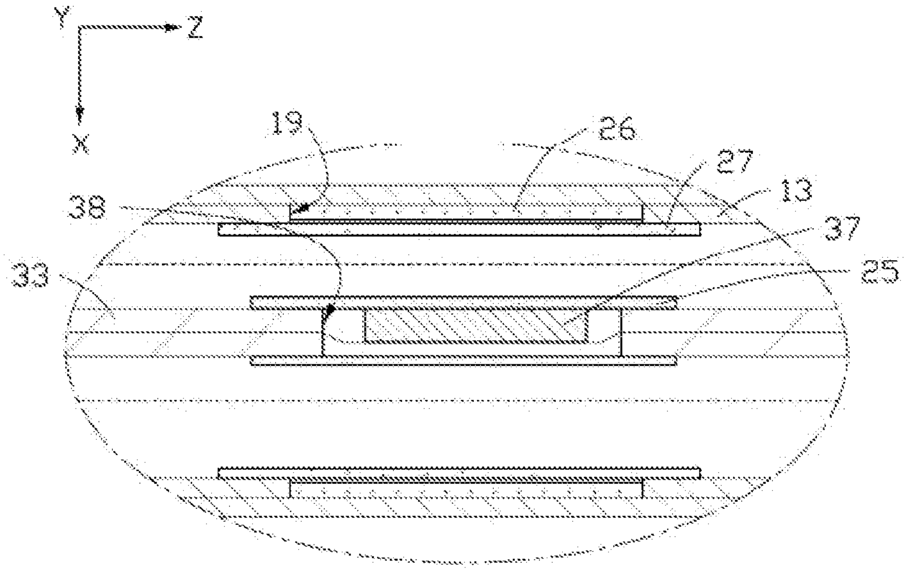
FIG. 14 is a partial enlarged diagram of a battery cell at position XIV according to an embodiment of this application.

In some embodiments, refer to FIG. 1A and FIG. 14. The second electrode plate 30 may further be provided with a third recess 38 formed by partial absence of the second active substance layer 33. The second electrode plate 30 may further include a second tab 37 disposed in the third recess 38 and connected to the second electrode plate 30.

Figure 15:
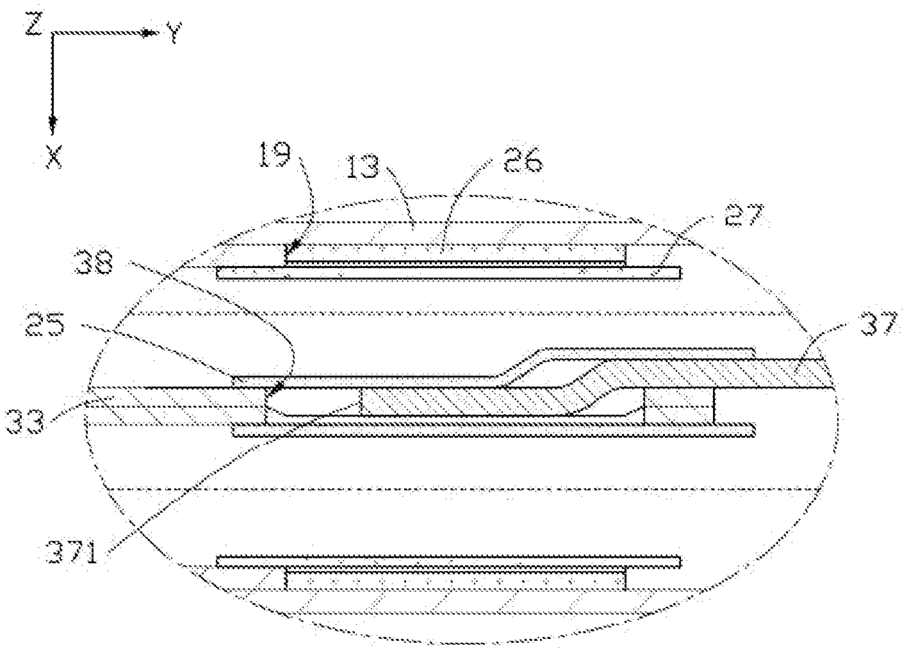
FIG. 15 is a partial enlarged cross-sectional view of a battery cell in a plane perpendicular to a width direction according to another embodiment of this application.

A third insulation layer 25 may be disposed on a surface of the second tab 37. In the width direction Z, the third insulation layer 25 extends beyond the second tab 37, that is, an edge of the third insulation layer 25 extends out of an edge of the second tab 37, such that the third insulation layer 25 covers the entire second tab 37 in the width direction Z. It is conducive to reduce the risk of short circuit caused by contact between the second tab 37 and the first electrode plate 10, thereby improving the safety of the battery cell. Refer to FIG. 15. In the length direction Y, the third insulation layer 25 extends beyond an end portion 371 of the second tab 37 disposed in the third recess 38, that is, an edge of the third insulation layer 25 extends out of the end portion 371 of the second tab 37, such that the third insulation layer 25 covers the entire end portion 371 of the second tab 37 in the length direction Y It is further conducive to reduce the risk of short circuit caused by contact between the second tab 37 and the first electrode plate 10, thereby improving the safety of the battery cell.

Refer to FIG. 14. In the thickness direction X of the battery cell, on a region of the first electrode plate 10 corresponding to the third recess 38 or the second tab 37, a fourth recess 19 is formed by absence of the first active substance layer 13. In the thickness direction X of the battery cell, the fourth recess 19 and the third recess 38 are arranged opposite each other.

The battery cell 100 may further include a second insulation holding member 26 disposed in the fourth recess 19. This helps to reinforce strength and thickness of the first electrode plate 10 at the fourth recess 19, and reduce difference between the first electrode plate 10 at the fourth recess 19 and the first electrode plate 10 at other regions caused by the battery cell being stressed (for example, being pressed), thereby reducing influence on the interface consistency of the battery cell.

In the thickness direction X of the battery cell, a thickness of the second insulation holding member 26 is preferably less than a thickness of the first active substance layer 13 enclosing the fourth recess 19 on the first current collector 11, thereby helping to improve the structural flatness of the battery cell.

The second insulation holding member 26 may be but is not limited to an insulation adhesive, for example, an adhesive tape or a hot melt adhesive. When the second insulation holding member 26 is a hot melt adhesive, in the case of being heated, the second insulation holding member 26 may effectively fill the fourth recess 19, so that the second insulation holding member 26 is seamlessly connected to the first active substance layer 13. It is further conducive to reduce difference between the first electrode plate 10 at the fourth recess 19 and the first electrode plate 10 at other regions caused by the battery cell being stressed (for example, being pressed), thereby reducing influence on the interface consistency of the battery cell. In some embodiments, a gap may be disposed between the second insulation holding member 26 and the first active substance layer 13.

The battery cell 100 may further include a fourth insulation layer 27, and the fourth insulation layer 27 is disposed on a surface of the second insulation holding member 26. In some embodiments, the periphery of the fourth insulation layer 27 may alternatively extend from the periphery of the second insulation holding member 26, and cover part of a surface of the first active substance layer 13 enclosing the fourth recess 19. It is further conducive to reduce the risk of short circuit caused by contact between burrs on the second tab 37 and the first electrode plate 10, thereby improving the safety of the battery cell. Preferably, on a projection plane perpendicular to the thickness direction X of the battery cell, an orthographic projection of the third insulation layer 25 entirely falls within an orthographic projection of the fourth insulation layer 27. In some embodiments, a width of an edge of the orthographic projection of the fourth insulation layer 27 extending beyond an edge of the third insulation layer 25 on the same side is greater than or equal to 1.5 mm.

Figure 16:
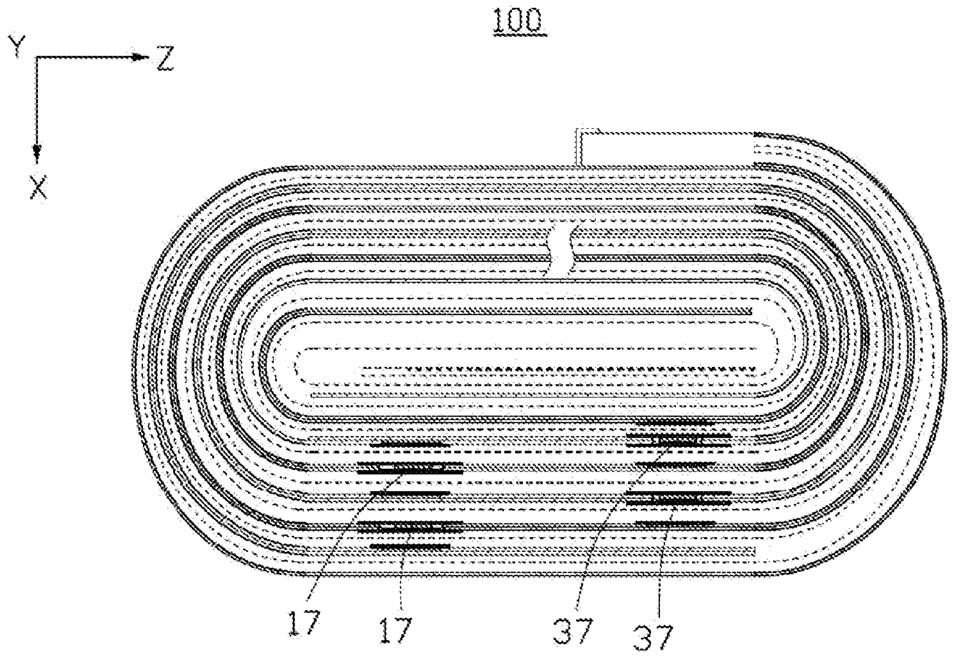
FIG. 16 is a schematic structural diagram of a battery cell according to still another embodiment of this application.

In some embodiments, refer to FIG. 16. When the battery cell 100 is of a wound battery cell, the first electrode plate 10 may include a plurality of first tabs 17, and in the thickness direction X of the battery cell, the plurality of first tabs 17 may be stacked. Similarly, the second electrode plate 30 may also include a plurality of second tabs 37, and in the thickness direction X of the battery cell, the plurality of second tabs 37 may be stacked.

Figure 17:
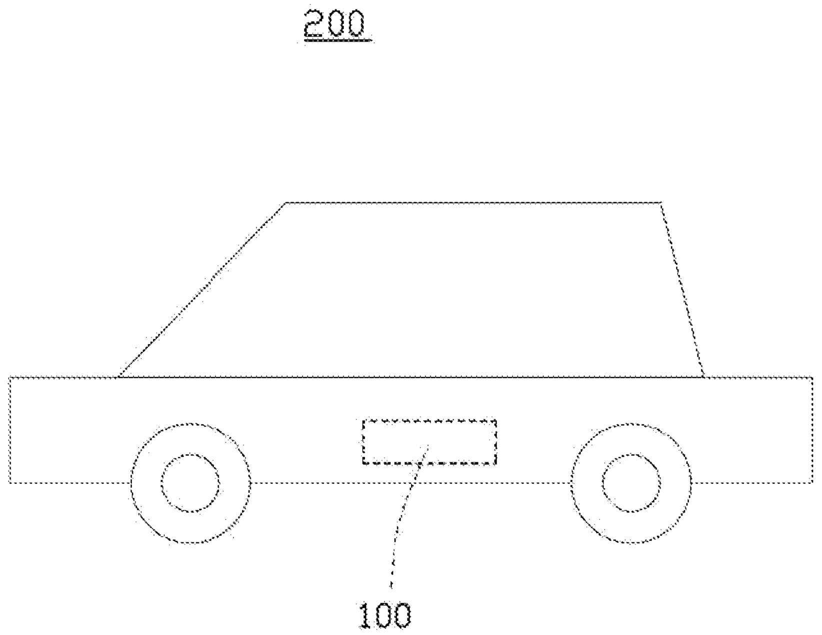
FIG. 17 is a schematic structural diagram of an electric device according to an embodiment of this application.

Refer to FIG. 17, the battery cell 100 may be used in an electric device 200, and the electric device 200 may be but is not limited to an energy storage product or an electric vehicle, for example, an electric toy, an automobile, a gaming device, or a computer. The electric device 200 further includes a load (not shown in the figure), and the battery cell 100 is configured to supply power to the load.

According to the battery cell 100 and the electric device 200 using the battery cell 100 in this application, in the thickness direction X of the battery cell, the first recess 15 and the second recess 35 are arranged opposite each other; and in the thickness direction X of the battery cell, the thickness of the battery cell at the first tab 17 is $H_1$, and the average thickness of the battery cell is $H_2$, where $H_2 \geq H_1$. It is conducive to reduce the overall thickness of the battery cell, which in turn reduces influence of provision of the first tab on the overall thickness of the battery cell, and improves the structural flatness of the battery cell, thereby improving the safety of the battery cell.

Thickness Test Method

Overall Thickness Measurement of Battery Cell

Measuring instrument: PPG pouch battery thickness gauge

Test Steps:

S1. Start the measuring tool and reset the meter to zero.

S2. Place a battery cell under test on a test bench and adjust it to a proper measuring position.

S3. Read stable values measured by the measuring instrument under an appropriate pressure.

Local Thickness Measurement of Battery Cell

Measuring instrument: digimatic micrometer

Test Steps:

S1. Reset the meter to zero and rotate the shaft sleeve to open the alloy measuring surface.

S2. Hold the battery cell body by the non-measuring position, and put the measuring position of the battery cell into between the alloy measuring surfaces.

S3. Rotate the shaft sleeve until the alloy measuring surface comes into light contact with the measuring position of the battery cell; and then rotate the ratchet 3 times, showing that the battery cell is in full contact with the measuring surface.

S4. Read the data on the liquid crystal display, namely, the thickness of the measurement position of the battery cell.

S5. Measure thicknesses of $H_1$ and $H_2$ at three positions in the same method, and record the average value.

In addition, persons of ordinary skill in the art may make various other corresponding changes and modifications according to the technical concept of this application, and all such changes and modifications shall fall within the protection scope of this application.

What is claimed is:

1. A battery cell, comprising a first electrode plate and a second electrode plate alternately stacked; wherein a separator is disposed between the first electrode plate and the second electrode plate, the first electrode plate comprises a first current collector and a first active substance layer disposed on a surface of the first current collector, and the second electrode plate comprises a second current collector and a second active substance layer disposed on a surface of the second current collector; wherein the first electrode plate further comprises a first recess formed by absence of the first active substance layer on the surface of the first current collector and a first tab disposed in the first recess;

the second electrode plate comprises a second recess formed by absence of the second active substance layer on the surface of the second current collector;

in a thickness direction of the battery cell, the first recess and the second recess are arranged opposite to each other;

a first insulation layer is disposed on a surface of the first tab; and the second recess is provided with a first insulation holding member, wherein a bottom of the second recess is the surface of the second current collector, and the first insulation holding member is disposed on the surface of the second current collector at the bottom of the second recess.

2. The battery cell according to claim 1, wherein in the thickness direction of the battery cell, a thickness of the first electrode plate at the first tab is $h_1$; a region of two opposite surfaces of the first current collector each provided with the first active substance layer in the first electrode plate is a first electrode plate body region, an average thickness of the first electrode plate body region is $h_2$, and $h_2>h_1>h_2/2$.

3. The battery cell according to claim 1, wherein a region of two opposite surfaces of the first current collector each provided with the first active substance layer in the first electrode plate is a first electrode plate body region, the first current collector comprises a main region connected to the first recess and corresponding to the first electrode plate body region, the first recess comprises a bottom wall and a side wall connecting the bottom wall and the main region of the first current collector, and an angle between the bottom wall and the side wall is an obtuse angle.

4. The battery cell according to claim 1, wherein the first tab extends out of the first electrode plate in a length direction, and a direction perpendicular to both the length direction and the thickness direction is defined as a width direction;

in the width direction, the first insulation layer extends beyond the first tab; and in the length direction, the first insulation layer extends beyond an end portion of the first tab disposed in the first recess.

5. The battery cell according to claim 4, wherein an orthographic projection of the second recess on a projection plane perpendicular to the thickness direction of the battery cell falls within an orthographic projection of the first recess on the projection plane perpendicular to the thickness direction of the battery cell.

6. The battery cell according to claim 5, wherein a second insulation layer is disposed on a surface of the first insulation holding member;

in the width direction, a width of the first insulation layer is $W_{t1}$, and a width of the second insulation layer is $W_{t2}$, $W_{t1}>W_{t2}$; and in the length direction, the first insulation layer extends beyond the second insulation layer.

7. The battery cell according to claim 6, wherein a second gap is disposed between the first insulation holding member and the second active substance layer, and the second gap is filled with the second insulation layer.

8. The battery cell according to claim 6, wherein in the thickness direction of the battery cell, a thickness of the first insulation holding member is less than a thickness of the second active substance layer.

9. The battery cell according to claim 4, wherein in the width direction, a width of the first recess is $W_{r1}$, a width of the second recess is $W_{r2}$, and $W_{r2}>W_{r1}$; and in the width direction, an edge of the second recess extends beyond an edge of the first recess.

10. The battery cell according to claim 9, wherein in the length direction, an edge of the first recess extends beyond an edge of the second recess.

11. The battery cell according to claim 10, wherein on a projection plane perpendicular to the thickness direction of the battery cell, an orthographic projection of the second recess falls within an orthographic projection of the first insulation layer.

12. The battery cell according to claim 1, wherein the first insulation holding member comprises an adhesive tape or a hot melt adhesive.

13. The battery cell according to claim 4, wherein two surfaces of the first tab spaced apart in the thickness direction are each provided with the first insulation layer.

14. The battery cell according to claim 1, wherein in the thickness direction of the battery cell, a thickness of the battery cell at the first tab is $H_1$, an average thickness of the battery cell is $H_2$, and $H_2 \geq H_1$.

15. The battery cell according to claim 14, wherein $H_2$-$H_1$≥0.02 mm.

16. The battery cell according to claim 1, wherein two surfaces of the first current collector at the first recess are both exposed to form a first slot and a second slot on two opposite surfaces of the first electrode plate respectively.

17. The battery cell according to claim 16, wherein the first tab is disposed in the first slot; and the second recess comprises a first opposite groove and a second opposite groove, the first opposite groove and the first slot are arranged opposite to each other, and the second opposite groove and the second slot are arranged opposite to each other.

18. The battery cell according to claim 17, wherein edges of the first opposite groove and the second opposite groove are staggered.

19. The battery cell according to claim 17, wherein edges of the first slot and the second slot are staggered.

20. The battery cell according to claim 17, wherein edges of the first opposite groove and the first slot are staggered.

21. The battery cell according to claim 1, wherein the second electrode plate further comprises a third recess formed by absence of the second active substance layer, the battery cell further comprises a second tab disposed in the third recess, and a fourth recess is formed by absence of the first active substance layer at the first electrode plate corresponding to two surfaces of the second tab.

22. The battery cell according to claim 21, wherein a third insulation layer is disposed on a surface of the second tab; and the fourth recess is provided with a second insulation holding member, a fourth insulation layer is disposed on a surface of the second insulation holding member, and the fourth insulation layer extends beyond the third insulation layer.

23. The battery cell according to claim 1, wherein the first tab extends out of the first electrode plate in a length direction, and a direction perpendicular to both the length direction and the thickness direction is defined as a width direction; and in the width direction, the first active substance layer is disposed on two sides of the first recess.

24. The battery cell according to claim 1, wherein the first tab extends out of the first electrode plate in a length direction; and in the length direction, the first active substance layer is disposed on both a first side and a second side of the first recess, the first side and the second side being opposite to each other.

25. The battery cell according to claim 24, wherein in the length direction, the first tab extends out of the first side of the first recess, and a width of the first active substance layer disposed on the first side is 2 mm to 4 mm.

26. The battery cell according to claim 1, wherein the battery cell is a wound battery cell, the first electrode plate comprises a plurality of first tabs, and in the thickness direction of the battery cell, the plurality of first tabs are stacked.

27. The battery cell according to claim 9, wherein in the length direction, an edge of the second recess extends beyond an edge of the first recess, wherein on a projection plane perpendicular to the thickness direction of the battery cell, an entire orthographic projection of the second recess falls within an orthographic projection of the first insulation layer, and an entire orthographic projection of the first recess falls within an orthographic projection of the first insulation holding member disposed in the second recess.

28. The battery cell according to claim 22, wherein on a projection plane perpendicular to the thickness direction of the battery cell, an entire orthographic projection of the third insulation layer falls within an orthographic projection of the fourth insulation layer.

29. An electric device, comprising a load and a battery cell configured to supply power to the load, the battery cell comprising a first electrode plate and a second electrode plate alternately stacked; wherein a separator is disposed between the first electrode plate and the second electrode plate, the first electrode plate comprises a first current collector and a first active substance layer disposed on a surface of the first current collector, and the second electrode plate comprises a second current collector and a second active substance layer disposed on a surface of the second current collector; wherein the first electrode plate further comprises a first recess formed by absence of the first active substance layer on the surface of the first current collector and a first tab disposed in the first recess;

the second electrode plate comprises a second recess formed by absence of the second active substance layer on the surface of the second current collector;

in a thickness direction of the battery cell, the first recess and the second recess are arranged opposite to each other;

a first insulation layer is disposed on a surface of the first tab; and the second recess is provided with a first insulation holding member, wherein a bottom of the second recess is the surface of the second current collector, and the first insulation holding member is disposed on the surface of the second current collector at the bottom of the second recess.

* * * * *